May 8, 1962 A. F. NEWELL ETAL 3,034,073

PUSH-PULL TRANSISTOR INVERTER

Filed May 24, 1960

INVENTOR
A.F. NEWELL
W.L. STEPHENSON
BY
Frank R. Trifari
AGENT

United States Patent Office 3,034,073

Patented May 8, 1962

3,034,073

PUSH-PULL TRANSISTOR INVERTER

Allen Frederick Newell, Southampton Hants, and William Lawrence Stephenson, Horley, England, assignors to North American Philips Company, Inc., New York, N.Y., a corporation of Delaware Filed May 24, 1960, Ser. No. 31,479
Claims priority, application Great Britain June 29, 1959
1 Claim. (Cl. 331—114)

This invention relates to push-pull transistor inverters.

In known push-pull transistor inverter arrangements the problem exists of determining the timing with which switching is effected from one transistor to the other. In conventional circuits, which frequently employ a saturating core, the conducting transistor is in the bottomed condition and constant base drive is applied thereto until the transistor reaches its maximum available collector current, i.e. the collector current ($Ic$) reaches the value $Ic=\alpha' Ib$ (where $Ib$ is the base current). Since the collector current cannot rise further, the transistor is forced out of the bottomed condition and this initiates the switch-over action.

These methods present a number of well-known disadvantages. The main disadvantage is that, if a circuit is designed to cope with spreads in transistor characteristics (e.g. $\alpha'$) due to unavoidable lack of uniformity in manufacture, then the maximum available collector current with the best transistors may be several times greater than the useful collector current supplied to the load. This means that it is only possible to make use of a fraction of the power handling capability of the transistor.

It is an object of the present invention to provide improved inverter circuit arrangements which permit the above disadvantages to be overcome.

According to the present invention a push-pull transistor inverter or square-wave generator circuit arrangement comprises in combination a pair of transistors, a transformer having a core together with a pair of collector windings connected respectively in series in the collector circuits of said transistors, a feedback winding on said core which winding is connected to the base electrodes of both transistors through a feedback loop which includes both of said base electrodes, and time determining components constituted by a capacitance and a resistance connected in series between said base electrodes in said feedback loop for the purpose of controlling the timing of the operation of the arrangement, the arrangement being such that said core does not saturate during operation.

With such an arrangement the timing function is performed in the base circuits of the transistors and therefore there is no need to pass currents at high peak levels when the load is small. This principle is known per se, but it is applied in the present invention in a particularly effective and convenient manner.

Since a circuit arrangement according to the invention generates a square-wave, the arrangement is suitable for use as part of a D.C. converter wherein a square-wave output is rectified to provide a D.C. supply.

Specific embodiments of the invention will now be described by way of example with reference to the diagrammatic drawing accompanying the specification as applied to p-n-p junction transistors.

Figure 1:
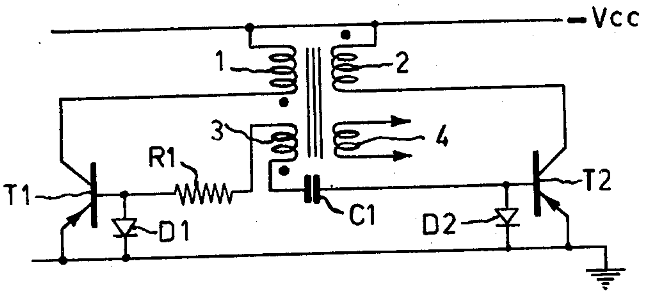
Figure 2:
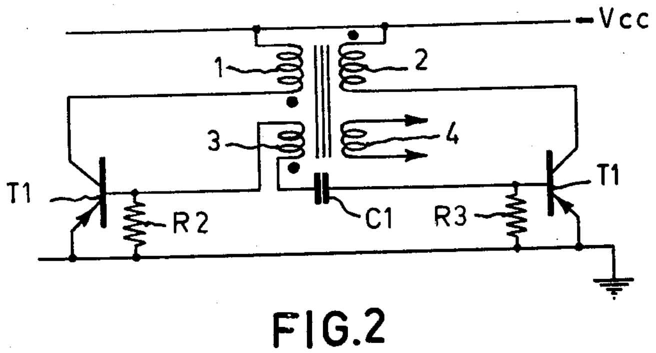

Referring now to the drawing, each of the circuits shown in FIGS. 1 and 2 employs a pair of transistors T1—T2 and a transformer having collector windings 1, 2 connected to a supply $-Vcc$ and a feedback winding 3 within a base feedback loop. In addition, there is a transformer output winding 4 for providing a square-wave output which may, if desired, be rectified to provide D.C. converter action.

In the circuit of FIGURE 1 the timing is mainly determined by the capacitor C1 and the resistor R1. Diodes D1 and D2 provide the return path for the base currents of T2 and T1 respectively so that there is always a low-impedance path between emitter and base even when a transistor is cut off. The switch-over occurs when the capacitor has charged up sufficiently to reduce the base current to $Ic/\alpha'$. At this time the transistor comes out of its bottomed condition and regenerative switch-over occurs. The effect of $\alpha'$ variations from one transistor to another is, therefore, only to cause a difference in frequency (which is often not very important).

This circuit is advantageous in that a single capacitor is used for timing. The duration of each half cycle is thus affected by the previous half cycle (which will determine the voltage across the capacitor at switch-over); there is, therefore, a balancing action which tends to keep both half cycles equal.

The operation will be described in greater detail as follows.

It will be assumed at first that transistor T2 is turning on to the bottomed condition. In these circumstances substantially the whole of the D.C. supply voltage ($Vcc$) is applied suddenly across collector winding 2. At the same time there is induced on winding 3 a smaller voltage V3. This feedback voltage (V3) is applied via resistor R1 and capacitor C1 to the base-emitter section of transistor T2 with such polarity as to cause forward bias current in transistor T2 (thus rendering transistor T2 even more conductive) while applying a small positive voltage across diode D1 so as to provide reverse bias current in transistor T1. Thus the turning on of transistor T2 is effected in a cumulative manner while transistor T1 is being cut off.

Once transistor T2 reaches its bottomed condition its base current ($Ib2$) has an initial value substantially proportional to $V3/R1$ where V3 is the voltage induced in winding 3 but this current value decays owing to the presence of the capacitor C1. At a certain point this decay starts to take transistor T2 out of its bottomed condition. As a result, the voltage across winding 2 begins to decrease, and consequently the voltage V3 induced in winding 3 also decreases. As a further consequence, the base current $Ib2$ of transistor T2 is reduced more rapidly and this leads to transistor T2 being cut off in a cumulative manner.

At this point, transistor T1 starts to conduct because the feedback voltage V3 has decayed towards zero thus releasing the charge previously accumulated in capacitor C1. The capacitor begins to discharge and thus provides a rising forward bias current ($Ib1$) for the transistor T1. (At this stage, diode D1 is cut off while diode D2 begins to conduct). This in turn allows transistor T1 to be turned ON by a cumulative process similarly as described above in relation to transistor T2.

FIGURE 2 differs from FIGURE 1 in that resistors R2—R3 replace diodes D1—D2 with consequent reduction in cost. The operation is the same except insofar as one of the resistors completes the feedback loop when the corresponding transistor is cut off (the other resistor is then effectively out of action since the respective transistor is turned on and provides a path having much lower impedance).

A set of suitable values and comonents will now be given by way of illustration as applied to the circuit of FIGURE 2.

*Table*

Transformer core=two E-shaped ferrite cores (Mullard type FX1819) joined without air gap.

Collector windings (1 and 2)=wound together in bifilar manner, each having 100 turns of 22 SWG wire.

Feedback winding 3=33 turns of 38 SWG wire.

Transistors=Mullard type OC23 high-frequency power transistors.
Collector supply voltage $-Vcc=12$ volts.
Capacitor $C1=2\ \mu F$.
Resistors R2, R3=39 Ω.

In the absence of ancillary starting means, the circuits of FIGURES 1 and 2 (like most inverter circuits) are not suitable for self-starting under load since there is no forward bias until oscillations have begun. This can easily be remedied by inserting a resistance between each base and the collector supply rail so as to provide a degree of initial forward bias current. In the case of FIGURE 2, and assuming that the values of the table are used, each of said resistance may have a value of 2.7K.

What is claimed is:

A push-pull transistor inverter or square-wave generator circuit arrangement comprising: a pair of transistors each having collector, base and emitter electrodes, a source of D.C. potential having two terminals, a transformer having a core, a pair of collector-windings arranged on said core and connected in series with said source of potential in the collector-emitter circuits of said transistors respectively, a feedback winding on said core, said feedback winding being connected in series with a capacitor and a resistor between the respective base electrodes of said transistors, a diode connected between the base and emitter electrodes of each transistor, each diode being connected in the forward direction and completing the base-emitter circuit of each transistor for direct forward base current, said feedback winding, capacitor and resistor together forming a feedback loop closed by the base-emitter path of one of said transistors and the diode connected across the base-emitter path of the other transistor, said feedback loop determining the timing operation, said capacitor and resistor having values such that the core does not saturate during operation.

References Cited in the file of this patent

UNITED STATES PATENTS 2,927,281 Vogt et al. ............... Mar. 1, 1960